S. F. STILLWELL.
RAIL JOINT.
APPLICATION FILED OCT. 3, 1921.
1,401,827.
Patented Dec. 27, 1921.
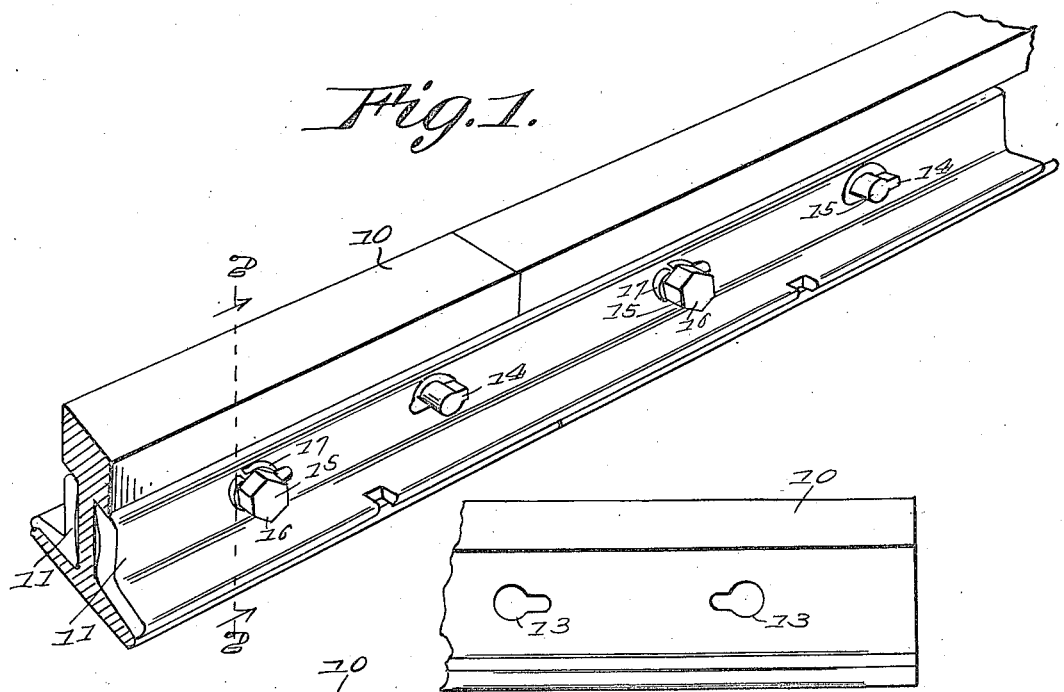
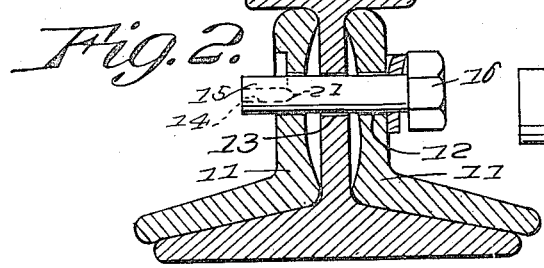
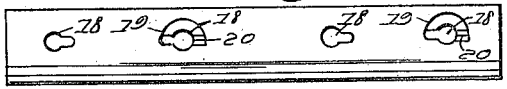
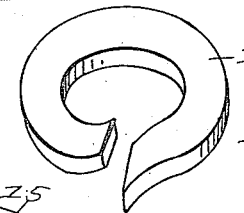
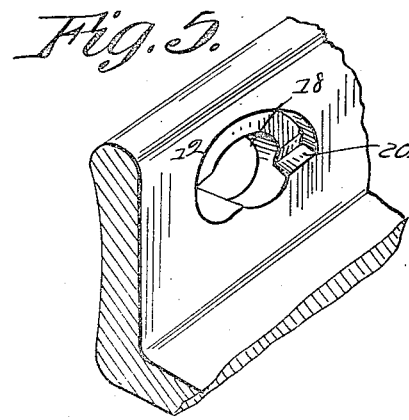
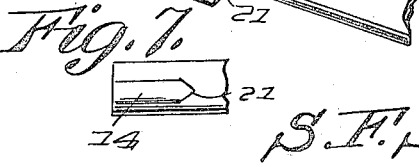
Inventor
S. F. Stillwell,
By
Attorney

UNITED STATES PATENT OFFICE.

SAMUEL F. STILLWELL, OF GRAFTON, WEST VIRGINIA.

RAIL-JOINT.

1,401,827. Specification of Letters Patent. Patented Dec. 27, 1921.

Application filed October 3, 1921. Serial No. 505,099.

*To all whom it may concern:*

Be it known that I, SAMUEL F. STILLWELL, a citizen of the United States of America, residing at Grafton, in the county of Taylor and State of West Virginia, have invented new and useful Improvements in Rail-Joints, of which the following is a specification.

The object of the invention is to provide a rail joint and more particularly fish plates and means for securing the same in place and to the adjoining ends of rail sections whereby the loosening or displacement of the fastening means as occurs in connection with the commonly used forms of bolts and nuts, and the resultant spreading of the rails, may be prevented without resorting to the use of fastening means which can not be removed when it is necessary to repair the track or substitute ties or new rail lengths; and more specifically the object of the invention is to provide a fish plate securing and rail engaging means having a tightening and locking engagement with the fish plates which is not subject to accidental displacement, nor to surreptitious removal except by the use of special means or tools not ordinarily in the possession of unauthorized persons; and with these objects in view the invention consists in a construction, combination and relation of parts of which a preferred embodiment is shown in the accompanying drawings, wherein:—

Figure 1 is a perspective view of a rail joint embodying a fastening means constructed in accordance with the invention.

Fig. 2 is a cross sectional view of the same on the plane indicated by the line 2—2 of Fig. 1.

Fig. 3 is a side view of one end of a rail length or section.

Fig. 4 is a similar view of one of the fish plates.

Fig. 5 is a detail view in perspective, enlarged of a portion of one of the fish plates to show the means for effecting an interlocking engagement of the bolt.

Fig. 6 is a detail perspective view of one end of the bolt.

Fig. 7 is a detail view showing the end of the bolt in elevation.

Fig. 8 is a detail perspective view of the spring washers.

The connected or adjoining rail ends indicated at 10 are overlapped by the fish plates 11 which in general form may correspond with the conventional construction of devices of this type with transverse openings 12 registering with openings 13 in the rail web, said openings being of the keyhole shape or type to permit of passage of the web 14 and shank 15 of a bolt 16, the bolt being provided at one end with said lateral wing or web and at the other end with a head of the hexagonal or other conventional form.

Interposed between the head of the bolt and the exterior surface of the fish plate is a spring washer 17 tending to resist the insertion of the bolt sufficiently to have the wing or web clear the outer surface of the other fish plate, and formed on the second fish plate in the path of movement of the web or wing when the bolt is turned is a cam 18, preferably countersunk or arranged in a recess 19 formed in the fish plate and terminating in a seat 20 for the reception of the inner edge of the wing or web when the bolt has been turned after insertion to the limit of its movement, which in the construction illustrated is of an angular extent of 180°.

The inner end of the wing or web is wedge shaped as shown at 21 and the seat is V-shaped to correspond therewith so that an interlocking engagement is formed between the wing or web and the fish plate when the bolt, having been turned to cause the wing or web to traverse the cam and by means of the cam has been drawn inward in opposition to the tension of the spring washer, until the said wing or web comes into the plane of the seat. When the wing or web snaps into the seat it is obvious that the spring washer will be under tension and the interlocking relation of the bolt and fish plate will thus maintain the parts in their adjusted relations against accidental displacement by reason of jarring or vibration of the rails.

Moreover with a spring washer of sufficient tension and a seat of sufficient depth, the release of the bolt even surreptitiously will be prevented except by someone having a special tool adapted to impart longitudinal and rotary movement to the bolt with sufficient force to overcome its opposing influence.

Having described the invention, what is claimed as new and useful is:—

1. A rail joint having fish plates connected through the rail by a transverse bolt provided at its extremities respectively with a head and a laterally projecting web or wing, the openings in the fish plates for the reception of the bolt shank being of keyhole form, and a spring washer interposed between the head of the bolt and the outer surface of the adjacent fish plate, the other fish plate being provided adjacent to its bolt opening with a progressively deflected cam face to be traversed by the inner edge of the web or wing, said cam face terminating in a seat for the reception of the inner edge of the web or wing, the seat and the engaging edge of the web or wing being of V-form.

2. A rail joint having fish plates connected through the rail by a transverse bolt provided at its extremities respectively with a head and a laterally projecting web or wing, a spring washer interposed between the head of the bolt and the outer surface of the adjacent fish plate, the other fish plate being provided with a progressively deflected face for engagement by the inner edge of the web or wing, the said deflected face terminating in a seat of V-form and the engaging edge of the web being of corresponding form.

In testimony whereof I affix my signature.

SAMUEL F. STILLWELL.